United States Patent [19]

Muncrief

[11] Patent Number: 5,156,743

[45] Date of Patent: Oct. 20, 1992

[54] OIL ABSORBENT LAYERED FABRIC SHEET

[76] Inventor: Paul M. Muncrief, 307 Avenue C, Post, Tex. 79356

[21] Appl. No.: 673,074

[22] Filed: Mar. 21, 1991

[51] Int. Cl.$^5$ ............................................. E02B 15/04
[52] U.S. Cl. ..................................... 210/671; 210/680; 210/693; 210/974; 156/62.6; 156/148; 156/296
[58] Field of Search ...................... 156/62.2, 62.6, 148, 156/166, 167, 296; 210/924, 693, 691, 692, 922, 671, 680, 505, 508

[56] References Cited

U.S. PATENT DOCUMENTS

| Re. 31,087 | 11/1982 | Sohl | 210/924 |
|---|---|---|---|
| 3,739,913 | 6/1973 | Bogosian | 210/924 |
| 3,986,959 | 10/1976 | Bagot et al. | 210/924 |
| 4,107,051 | 8/1978 | Lorentzen | 210/924 |
| 4,183,984 | 1/1980 | Browers et al. | 210/924 |
| 4,832,852 | 5/1989 | Wells et al. | 210/924 |

FOREIGN PATENT DOCUMENTS

| 1229121 | 4/1971 | United Kingdom | 156/148 |
|---|---|---|---|
| 1408392 | 10/1975 | United Kingdom | 156/148 |

Primary Examiner—Stanley S. Silverman
Assistant Examiner—Neil M. McCarthy
Attorney, Agent, or Firm—Tod R. Nissle

[57] ABSTRACT

A method for removing oil from the surface of a body of water using a layered sheet comprised of natural fabric fibers to absorb oil between the layers in the sheet, the natural fabric fibers in the sheet not requiring or undergoing treatment by or with synthetic chemical compositions during formation of the layered sheet. The layered sheet absorbs at least seven times its weight in oil without submerging in water. The layered sheet is placed on the floating oil which is absorbed by the sheet. The sheet is later removed from the water surface and compressed to squeeze oil from between the layers of the sheet.

2 Claims, 1 Drawing Sheet

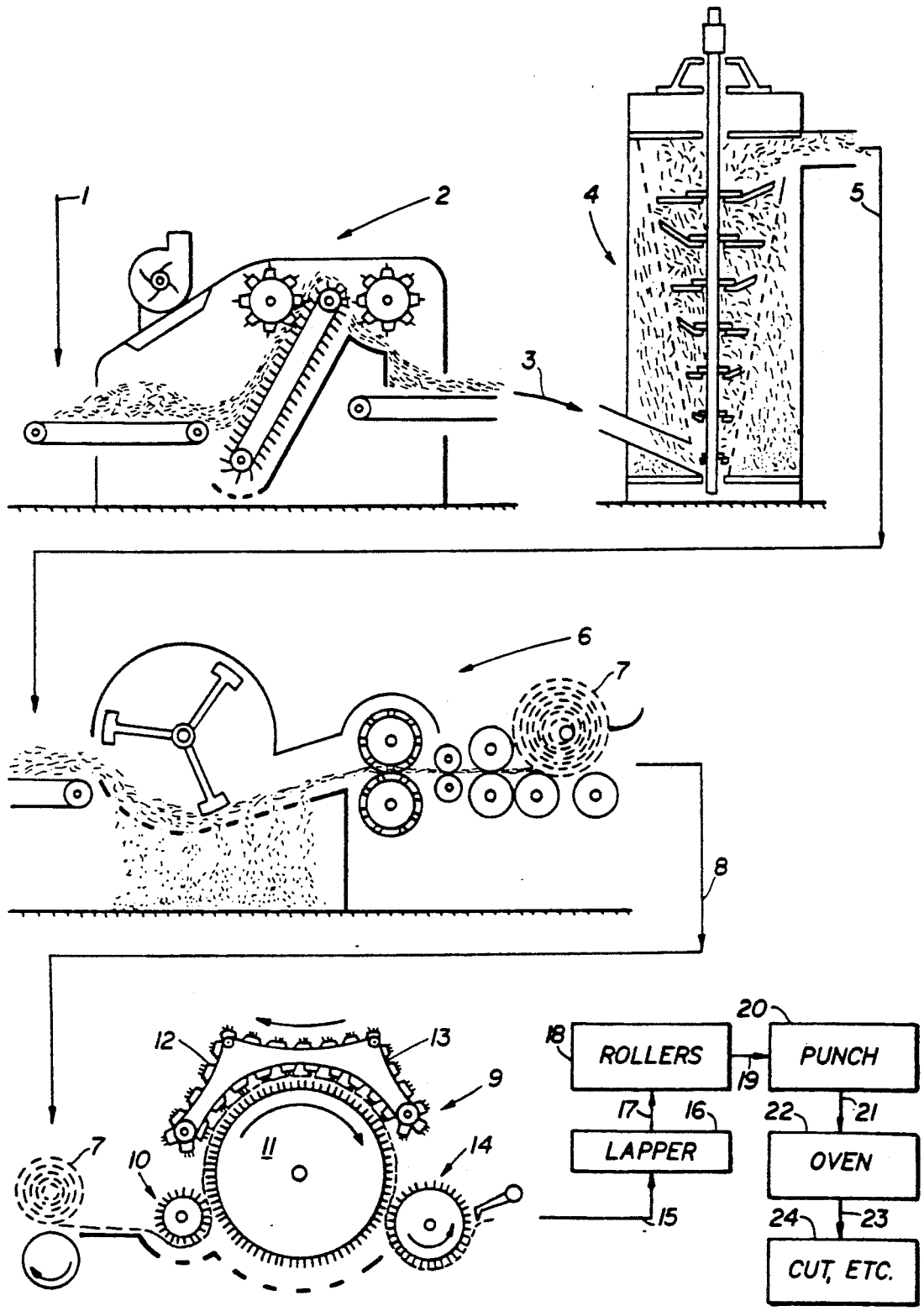

OIL ABSORBENT LAYERED FABRIC SHEET

This invention relates to methods and apparatus for removing oil from the surface of water.

More particularly, the invention relates to a method for forming a layered sheet substantially comprised of natural fabric fibers to absorb oil between the layers in the sheet, the natural fabric fibers in the sheet not requiring or undergoing treatment by or with synthetic chemical compositions during formation of the layered sheet.

In a further respect, the invention relates to a method of the type described in which natural waxes found in the fabric fibers are retained in the fibers during the formation of the layered sheet.

Apparatus for removing oil from the surface of water is well known in the art. See, for example, U.S. Pat. No. 3,667,067 to Burroughs et al. and U.S. Pat. No. 3,679,058 to Smith. In such prior art systems polypropylene or other similar polymeric materials are used to absorb oil. Polypropylene and other polymeric materials often either are not biodegradable or are not readily disposed of. Further, the oil absorbent materials used in prior art systems often, in manufacture, require treatment with a variety of synthetic chemical compositions which are not environmentally desirable in use or in manufacture. See U.S. Pat. No. 3,607,741 to Sohnius. Natural fabric fibers like cotton typically are not preferred in removing oil from the surface of water because fabric fibers absorb water and submerge, because they will not absorb large quantities of oil, or because their construction does not permit repeated removal from and return to the surface of water. Natural fabric fibers are, however, environmentally preferred because they are readily biodegradable and ordinarily contain few, if any, toxic chemical components.

Prior art oleophillic materials often absorb oil into cells or interstitial spaces which extend throughout a material. When oil is squeezed from the material, the oil must wind its way through such interstitial spaces to the surface of the material. If oil were instead absorbed into a material to form parallel layers which terminated at the edge of the material, then when the material was squeezed to remove oil from the material, the layered oil could flow directly out at the edges of the material.

Accordingly, it would be highly desirable to provide an improved oleophillic material which in substantial part is fabricated from natural fibers, which does not in manufacture require treatment by synthetic or other chemicals, which is lightweight, which is strong and able to withstand repeated removal from and return to the surface of a body of water, which has a structure which facilitates the removal of oil absorbed into the material, and which is hydrophobic. Therefore, it is a principal object of the invention to provide an improved material for removing oil from the surface of a body of water.

A further object of the invention is to provide an improved oleophillic material which is in substantial part fabricated from biodegradable natural fabric fibers which can, without requiring treatment with synthetic or other chemical compositions, repel water.

Another object of the invention is to provide an improved oleophillic material which is layered and absorbs oil to points intermediate adjacent layers in the oleophillic material.

A further object of the invention is to provide an improved oleophillic material which is comprised in large part of natural fabric fibers and has a strength sufficient to permit the material to be repeatedly pulled from and return to the surface of a body of water.

These and other, further and more specific objects and advantages of the invention will be apparent to those skilled in the art from the following detailed description thereof, taken in conjunction with the drawing.

Briefly, in accordance with my invention, I provide a method for forming a layered sheet substantially comprised of natural fabric fibers to absorb oil between the layers in the sheet. The method includes the steps of blending at a first selected temperature binder fibers with natural fabric fibers to produce a mixture of the binder and natural fibers in random orientation, the natural fibers having a melting temperature at which at least certain of said natural fibers melt, the melting temperature being greater than the first selected temperature, and containing water repellent material, the binder fibers having at least one bonding temperature at which the binder fibers soften and adhere to the natural fibers, the bonding temperature being greater than 130° F., greater than the selected blending temperature, and less than the melting temperature of the natural fibers; feeding the mixture of fibers into processing—carding means to produce a web having a thickness in the range of 0.001 inch to 0.100 inch, and comprised principally of parallel elongate strands of thread; transporting at a second selected temperature the web to a lapping machine to be cross lapped into a sheet having at least ten overlaid cross lapped web layers, and a thickness greater than the thickness of the web, cross lapping at a third selected temperature the web with the lapping machine to form the sheet; directing the sheet between a pair of opposed rollers to compress the sheet; needle punching the compressed sheet to displace at least some of the natural fibers such that the displaced natural fibers extend between a pair of said layers and contact natural fibers in said pair of layers; transporting at a fourth selected temperature the needle punched sheet to apparatus for heating the sheet to the bonding temperature, the bonding temperature being less than the melting temperature of the natural fibers and greater than the first, second or third and fourth selected temperatures; heating the sheet with the heating apparatus to a temperature equal to or greater than the bonding temperature to cause the binder fibers to soften and adhere to the natural fibers such that at least certain of the displaced natural fibers are each bonded by the softened binder fibers to and interconnect one of the natural fibers in one of the layers with another of the natural fibers in another of the layers, and the water repellant material of the natural fibers remains in the fibers; and, cooling the batt to harden the softened binder fibers. The cooled batt is oleophillic and absorbs oil to locations intermediate the layers, and is buoyant and able to absorb at least seven times the weight of the batt in oil without submerging in water. The natural fibers in the batt are hydrophobic. The processing—carding means includes a carding machine including a licker-in roll including wire having 40 to 50 teeth per square inch and a working angle in the range of 15° to 25°; a main cylinder including wire having 300 to 700 teeth per square inch and a working angle in the range of 17° to 27°; and, a doffer including wire having from 150 to 250 teeth per square inch and a working angle in the range of 17° to 27°.

Turning now to the drawing, which depicts the presently preferred embodiment of the invention for the purpose of illustrating the practice thereof and not by way of limitation of the scope of the invention, a method for producing an insulative batt is illustrated in which bales of cotton 1 or another natural fabric fiber are first loosened up and separated into individual fibers or small groups of fibers by the hopper bale-breaker 2. Other hopper bale-breakers 2 are utilized to "open" binder fibers, stilt fibers, or other types of fibers to be blended with or added to fibers produced by bale-breaker 2. Fibers from hopper bale-breaker 2 are directed 3 into blender-opener 4 at a first selected temperature. Binder fibers, stilt fibers, or other types of natural fabric fibers can be added to blender-opener 4 in any desired proportion with natural fabric fibers 3 from hopper-breaker 2. Randomly oriented intermixed fibers from blender-opener 4 are transported 5 to the picker or scratcher 6. Picker 6 forms the loose fibers into a sheet (the 37 lap") which is wound into a roll 7. Roll 7 is transported 8 to a revolving flat card machine 9 and fed into machine 9 at a second selected temperature. Card machine 9 includes a taker-in roller or licker-in 10 provided with teeth which tear away small bunches of fiber from the lap. Main cylinder 11 is provided with teeth which strip small bunches of fiber from the licker-in. Narrow bars or flats 12 are carried by an endless belt 13 and are provided with teeth which exercise a combing action and remove impurities. The web from main cylinder 11 travels around doffer 14 and is directed or transported 15 at a third selected temperature to a lapper 16. The lapper folds the web 15 at a fourth selected temperature upon itself to produce a batt or sheet of desired thickness having parallel adjacent layers. Lapper 16 is preferably a cross-lapper, but can be any conventional lapper machine. Similarly, card machine 9, picker 6, blender-opener 4 and bale-breaker 2 can be replaced with any conventional apparatus performing similar functions with respect to the insulative, stilt, and binder fibers used in the practice of the method of the invention. Batt or sheet produced by lapper 16 is transported 17 to and travels between a pair of opposed rollers 18 which compress the sheet at a fifth selected temperature. The rollers typically exert about 2500 psi on the sheet and, for example, reduce a 32 layer six inch thick sheet to a one-quarter inch thick sheet. Compressed sheet from rollers 18 is transported 19 to a light needle punch loom 20. The loom 20 utilizes the barbs on needles to pull at least selected natural fabric fibers in the sheet between layers such that the pulled or displaced fabric fibers each extend from at least one layer to another layer and each contact at least one natural fiber in one layer and at least one natural fiber in another layer. The compressed sheet is processed in loom 20 at a sixth selected temperature. Compressed sheet from loom 20 transported 21 to bonding oven 21 which heats the sheet to a temperature sufficient to soften binder fibers contained in the sheet. When the binder fibers soften, they adhere to natural fabric fibers and bind the fabric fibers to one another. The softened binder fibers bind fabric fibers which were displaced by the needle punch loom 20 to at least one fabric fiber in one layer and at least one fabric fiber in another layer such that the displaced fibers extend between a pair of layers and function to interconnect the layers. Binder fibers or other types of fibers can be intermixed with fabric fibers in blender-opener 4 or added to the sheet during its transport 15 to lapper 16, during lapping 16, during transport 17 to rollers 18, during transport 19 from rollers 18 to loom 20, during punching in loom 20, or during transport 21 from the lapped web to oven 22. Sheet from oven 22 is cooled and transported 23 to additional processing stations 24.

One procedure performed by processing stations 24 is cutting the sheet. The sheet can be cut into short segments, balls, and any other desired shape and dimension. The natural fabric fiber(s) added to blender-opener 4 in FIG. 1 are selected from natural fibers like cotton, wool, flax, jute, mohair, silk, ramie, hemp and asbestos which are utilized in the manufacture of fabrics or cloth. The proportion of a natural fiber added to the blender-opener 4 can vary as desired and typically is in the range of 50% to 95% by weight. As earlier noted, a binder fiber is added to the natural fibers. Binder fibers are added to blender-opener 4 in the proportion in the range of two to eighty percent by weight of the natural fiber. The binder fiber has a softening temperature which is less than the melting temperature of any of the natural fibers added to blender-opener 4. Accordingly, when a batt from lapper 16 passes through oven 22, oven 22 is heated to a temperature equal to or greater than the softening temperature of the binder fiber and less than the melting temperature of any of the natural fibers. Oven 22 thus causes the binder fibers to soften and adhere to the natural fibers and bond or interconnect natural fibers to one another. As used herein, the term "soften" when applied to binder fibers means that the binder fiber begins to lose its hardness and/or melts such that the binder fiber can adhere to and interconnect natural fibers after the binder fibers are heated to a selected temperature and then cooled to a normal room temperature of 78° F. Some binder fibers become "sticky" and adhere to a natural fiber before the binder fiber melts. Other binder fibers have to melt before they will adhere to natural fibers. A melted binder fiber and a softened "sticky" binder fiber each comprise a "softened" binder fiber. The presently preferred binder fiber is a polyester fiber. Any other desired synthetic or natural fiber can be utilized as a binder fiber.

The binder fibers can be added to lap 7 or can be added to the sheet at any point after the sheet is produced by card machine 9 and prior to heating of the sheet in oven 22. The melting temperature of the binder fibers can vary as desired as long as the melting temperature is greater than the temperature(s) at which the binder fibers are processed by machines 4, 6, 9, 16, 18, and 20 in the method of the invention up until the sheet is heated in oven 22, provided that the melting temperature of the natural fibers is greater than the softening temperature of the binder fibers, and provided that the softening temperature is at least 130° F. Binder fibers with softening temperatures less than 130° F. are inconvenient because the binder material may soften or melt when maintained in an non-air conditioned storage shed in the summer or in the enclosed non-air conditioned bed of a vehicle. The preferred melting temperature of the binder fibers is presently in the range of 180° F. to 450° F. The binder fibers can take the form of actual fibers or of powder produced from fibers or from the material used to make the fibers. Adding binder fibers in powder form, particularly in blender-opener 4, can be advantageous. In contrast, the natural fibers comprising a large portion of the batt or sheet are in true fiber form. Other wise, the natural fibers could not be processed by bale-breaker 2, blender-opener 4, picker 6, and card machine 9. The binder fibers have a length in the range of 0.5 to 2.0 inches, with a length of 1.5 inches being preferred. Eastman Kodak 410 binder fiber is presently a preferred binder fiber in the practice of the invention.

The natural fabric fiber(s) 1 used in the practice of the invention are 0.5 inches or longer and are typically in the range of 0.5 inch to 1.5 inches long. The natural fibers can have denier in excess of 3.0, but a denier of 3.0 or less is preferred because the oleophillic batt or sheet produced is unusually light, but strong. When cotton is utilized, a denier in the range of 2.4 to 3.0 is preferred. The web produced by the card machine 9 has a preferred thickness in the range of 0.001 inch to 0.1 inch, even though a card machine can produce much thicker webs. By way of example, when a Hollingsworth 2.5-Meter-working-width MASTERCARD card machine is utilized, the licker-in roll 10 uses wire in the range of 40 to 50 teeth per square inch, preferably 50 teeth per square inch, and a working angle of 15° to 25°, preferably 20°; the main cylinder 11 uses wire in the range of 300 to 700 teeth per square inch, preferably 500 teeth per square inch, and a working angle in the range of 17° to 27°, preferably 22°; and, the doffer 14 uses wire in the range of 150 to 250 teeth per square inch, preferably 250 teeth per square inch, and a working angle in the range of 17° to 27°, preferably 22°. If desired, a plurality of card machines 9 can be utilized to produce web fed to lapper 16. An air lay machine, garnett or comparable web weaving machine can be utilized in place of card machine 9. The air lay machine produces a heavier non-uniform web. A garnett machine would produce web having larger air pockets than the web produced by card machine 9. The card machine is preferred in the practice of the invention because it discretely separates fibers and produces a relatively uniform fine kleenex-like spider web principally comprised of parallel, elongate strands of thread. These parallel strands comprise approximately 80 to 85% by weight, or more, of the web, while the remaining weight of the web consists of strands which are at an angle to and interconnect the parallel, elongate strands. Accordingly, when web produced by a card machine 9 is cross lapped 16 to form a sheet, each succeeding layer of web in the sheet has a longitudinal axis which is parallel to other web layers and to the parallel, elongate strands comprising the majority of the web layer and which is rotated 20° to 60°, preferably 30°, from the longitudinal axis of the preceding web layer in the batt.

When web produced by card machine 9 is being lapped by lapper 16, stilt fibers can be spread on a lapped layer of web just prior to the time that lapper 16 covers the first lapped layer of web with another web layer. These stilt fibers are 1/16 inch to ⅜ inch long, preferably ⅛ inch to ¼ inch long. The stilt fibers function to spread apart and maintain a space between adjacent lapped web layers comprising the sheet. When the sheet is heated in oven 22, softened binder fibers adhere to and interconnect stilt fibers and natural fibers. When the stilt fibers are applied to the web, additional binder fibers can be applied with the stilt fibers to facilitate the bonding of stilt fibers to natural fibers. A randomly oriented stilt fiber mixture is preferably applied to horizontally disposed layers of web during lapping of the web by lapper 16 because the stilt fibers tend to "ride" on top of a lower layer of web to separate the lower layer from the web layer adjacent and just above the lower layer. When the compressed sheet is heated by oven 22, the stilt layers are bonded to natural fibers. Stilt fibers can, if desired, be blended with longer natural fibers in blender-opener 4. KODAFIL 435 is a synthetic fiber which can be utilized as a stilt fiber as are cotton fibers having a length in the range of ⅛ inch to ⅜ inch. Stilt fibers, like natural fibers, have a melting point or temperature which is greater than the softening temperature of binder fibers used in the oleophillic sheet of the invention. Stilt fibers having a length shorter than ⅛ inch to ⅜ inch are often not desirable in producing fabric because of their short length.

A one-quarter inch thick oleophillic sheet produced in accordance with the method of FIG. 2 presently has a weight of about one to four ounces per square foot. The thickness of the sheet ordinarily is in the range of about one-eighth to one-half inch.

The following examples are presented, not by way of limitation of the scope of the invention, but to illustrate to those skilled in the art the practise of various of the presently preferred embodiments of the invention and to distinguish the invention from the prior art.

EXAMPLE 1

Cotton fibers having a length of ⅞ inch are selected as natural fabric fibers. Cotton gin moates and linters each having a length in the range of ⅛ inch to ¼ inch are selected as stilt fibers. E. I. du Pont Dacron D-262 polyester fibers are selected as binder fibers. The natural fabric fibers and stilt fibers have a denier of 2.8. The polyester fibers have a denier of 1.8, an elongate percent of 200, a length of inches, a melting point of 142° C. (softening at 78° C.) and a bonding temperature of 155° C. with respect to cotton, i.e., the Dacron D-262 polyester bonds to cotton fibers when heated to 155° C. The melting point of the natural fabric fibers exceeds 160° C.

A sheet is formed using the method of FIG. 1. The natural fabric fibers, stilt fibers, and binder fibers are blended together in a blender-opener 4 and processed with a picker 6 and card machine 9 to form a web which is transported 15 to a lapper 16. The natural fabric fibers comprise 65% by weight of the blended mixture; the cotton moates 20% by weight of the blended mixture; and, the binder particles 15% by weight of the blended mixture. The sheet produced by lapper 16 is transported 17 to rollers 18. The sheet from lapper 16 has thirty-two layers each about 0.001 inch thick. There preferably are at least ten layers in the sheet produced by lapper 16. Rollers 18 presently apply a compressive force of 2500 psi to the sheet from lapper 16, but any appropriate compressive force can be applied to the sheet by rollers 18. Rollers 18 can, if desired, be heated sufficiently to cause some or all of the binder fibers in the sheet from lapper 16 to soften and adhere to the natural fibers in the sheet. The compressed sheet from rollers 18 is transported 19 to punch loom 20. The barbs on needles in loom 20 pull some of the natural fibers in the compressed sheet in directions perpendicular to the longitudinal axis of the batt such that the pulled or displaced natural fibers extend from one layer to another layer in the sheet. Each displaced natural fiber contacts a non-displaced natural fabric fiber in one layer and also contacts a non-displaced natural fiber in another layer. The non-displaced natural fabric fibers generally lie in the plane of the sheet and are parallel to the longitudinal axis of the sheet. Since some of the stilt fibers are, because of their short size, randomly oriented in the sheet, certain of the stilt fibers also extend from one layer to another layer in the sheet and are perpendicular to or at an angle to such layers. The stilt fibers which extend from one layer to another layer usually each contact a non-displaced natural fabric fiber in one layer and also contact a non-displaced natural fabric fiber in another layer. Sheet from loom 20 is transported 21 to oven 22. The batt is heated in oven 22 to a temperature equal to or in excess of 155° C. to soften the polyester binder fibers and bond them to the natural fabric and stilt fibers. When the polyester fibers soften they also bond stilt fibers and displaced natural fibers to non-displaced fabric fibers in each of at least two layers. The sheet is structurally strengthened by each displaced natural fabric fiber which extends between at least two layers and is bonded to at least one non-displaced natural fabric fiber in each layer. The sheet is also structurally strengthened by each stilt fiber which extends between at least two layers and is bonded to at least one non-displaced natural fabric fiber in each layer. After being removed from oven 22 and cooled to room temperature, the sheet is cut 24 into section and packaged. The batt is one-quarter inch thick and has a density of two ounces per cubic foot. The thickness, length, and width of the batt can be varied as desired In order to avoid "burning off" the natural water-repellant wax contained in the natural fabric fibers, the sheet is rapidly heated in oven 22. Hot air is blown through the sheet in oven 22. The temperature of the air is presently about 375° F. but can be adjusted as desired depending on the thermal and other properties of the natural fabric fibers, stilt fibers and binder fibers being utilized. The 375° F. air takes about fifteen seconds to soften the binder fibers. The heated air or other gas is preferably blown through the sheet for a period of time less than thirty seconds. After about thirty to forty seconds, the natural wax in the cotton begins to vaporize.

Instead of relying on the natural wax found in a natural fabric fiber, the fiber can be impregnated with one or more other natural occurring waxes at any convenient point in the process illustrated in the drawing. For example, the sheet from doffer 14 could be sprayed with a bee or tree wax.

The sheet can, if desired, be manufactured without utilizing the stilt fibers described above.

Sheet manufactured in accordance with the process described in this Example 1 is placed on the surface of a body of water covered in oil. The sheet absorbs about nine times its weight in oil. As the oil is absorbed into the sheet, the oil migrates to positions intermediate layers in the sheet. Even though the layers are interconnected by displaced natural fabric fibers and stilt fibers and even though the layers otherwise contact one another at various points, the oil shows an affinity for locations intermediate the layers in the sheets. The sheet is passed between a pair of rollers to squeeze absorbed oil from the sheet. The oil oozes out the edges of the sheet in much the same fashion as the filling of an "OREO" cookie oozes out of the edges of the cookie when the two opposing circular halves of the cookie are squeezed toward one another. Oil captured in the sheet also squeezes out through the top and bottom planar surfaces of the sheet. Over 90%, typically about 98% of the oil in the sheet can be squeezed out using rollers. After the oil is squeezed from the sheet, the sheet is returned to the surface of the water, where it again absorbs about nine times its weight in oil. The sheets normally absorb over five times, typically up to nine times, its weight in oil while remaining buoyant.

Although the precise reason for the migration of absorbed oil to points between the layers in the sheet of the invention is not known for certain, the fine weave utilized in the manufacture of the sheet of the invention appears to facilitate such migration. The earlier described working angles and number of teeth per square inch utilized in the carding machine are therefore important in the practice of the invention.

Strips can be cut from a sheet manufactured in accordance with Example 1. The strips are bunched and sewn together along one end to form a mop head. The mop is heated to burn the wax off of the mop head so the strips will absorb water.

A sheet manufactured in accordance with the method of the invention can be provided with a waterproof polyester sheet backing and used to form a sleeping bag. The sheet "breathes" but still functions as an insulator with R values in the range of 2.0 to 2.5.

Having described my invention in such terms as to enable those skilled in the art to understand and practise it, and having identified the presently preferred embodiments thereof, I claim:

1. A method for removing oil from the surface of a body of water, said method including the steps of
(a) placing on the surface of said body of water a layered sheet substantially comprised of natural fabric fibers to absorb oil between the layers in said sheet, said sheet being formed by
(i) blending at a first selected temperature binder fibers with natural fabric fibers to produce a mixture of said binder and natural fibers in random orientation, said natural fibers
having a melting temperature greater than said first selected temperature, and
containing a water repellent material naturally occurring in said material,
said binder fibers having a bonding temperature at which said binder fibers soften and adhere to said natural fibers, said bonding temperature being greater than 130° F., greater than said selected blending temperature, and less than said melting temperature of said natural fibers,
(ii) feeding said mixture of fibers into processing—carding means to produce a web
having a thickness in the range of 0.001 inch to 0.1 inch, and
comprised principally of parallel elongate strands of thread,
(iii) transporting at a second selected temperature said web to a lapping machine to be cross lapped into a sheet having
a plurality of overlaid cross lapped web layers, and
a thickness greater than the thickness of said web,
(iv) cross lapping at a third selected temperature said web with said lapping machine to form said sheet,
(v) directing said sheet between a pair of opposed rollers to compress said sheet,
(vi) needle punching said compressed sheet to displace at least some of said natural fibers such that each of said displaced natural fibers extends between a pair of said layers and contacts natural fibers in said pair of said layers,
(vii) transporting at a fourth selected temperature said needle punched sheet to apparatus for heating said sheet to said bonding temperature, said bonding temperature being
less than said melting temperature of said natural fibers, and
greater than said first, second, third and fourth selected temperatures, (viii) heating said sheet with said heating apparatus to a temperature equal to or greater than said bonding temperature to cause said binder fibers to soften and adhere to said natural fibers such that
at least certain of said displaced natural fibers are each bonded by said softened binder fibers to and interconnect one of said natural fibers in one of said layers with another of said natural fibers in another of said layers,
said water repellent material of said natural fibers remains in said fibers, and,
cooling said batt to harden said softened binder fibers,
said cooled batt being
oleophillic and absorbing oil to locations intermediate said layers, and
buoyant and able to absorb at least seven times the weight of said batt in oil without submerging in water, and,
said natural fibers in said batt being hydrophobic;

(b) removing said sheet from said body of water; and,
(c) compressing said sheet to squeeze oil from between said layers in said sheet.

2. The method of claim 1 wherein said natural fibers are cotton.

* * * * *